Sept. 6, 1966          A. BERGE          3,270,709
DEVICE FOR ORGANIZING AND PLANNING VARIOUS ACTIVITIES
Filed Jan. 23, 1964          2 Sheets-Sheet 1
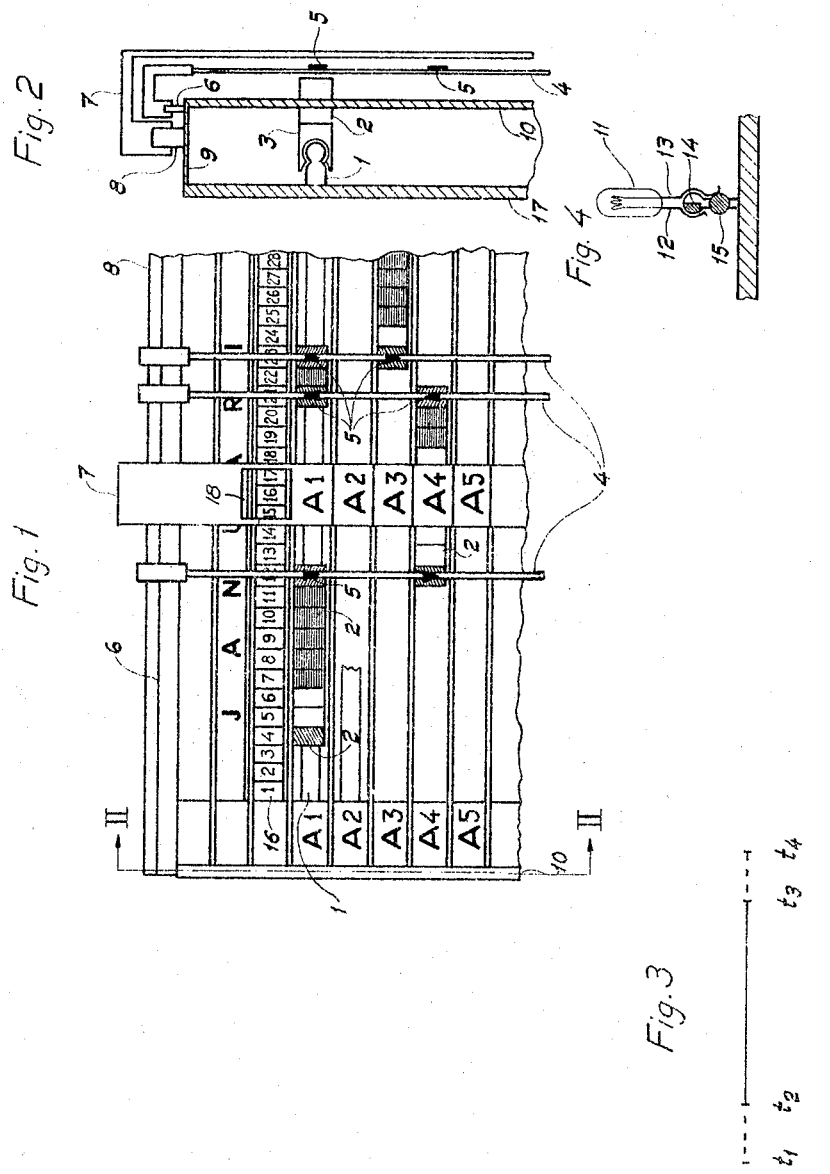
INVENTOR.
ARTHUR BERGE Sept. 6, 1966          A. BERGE          3,270,709
DEVICE FOR ORGANIZING AND PLANNING VARIOUS ACTIVITIES
Filed Jan. 23, 1964          2 Sheets-Sheet 2
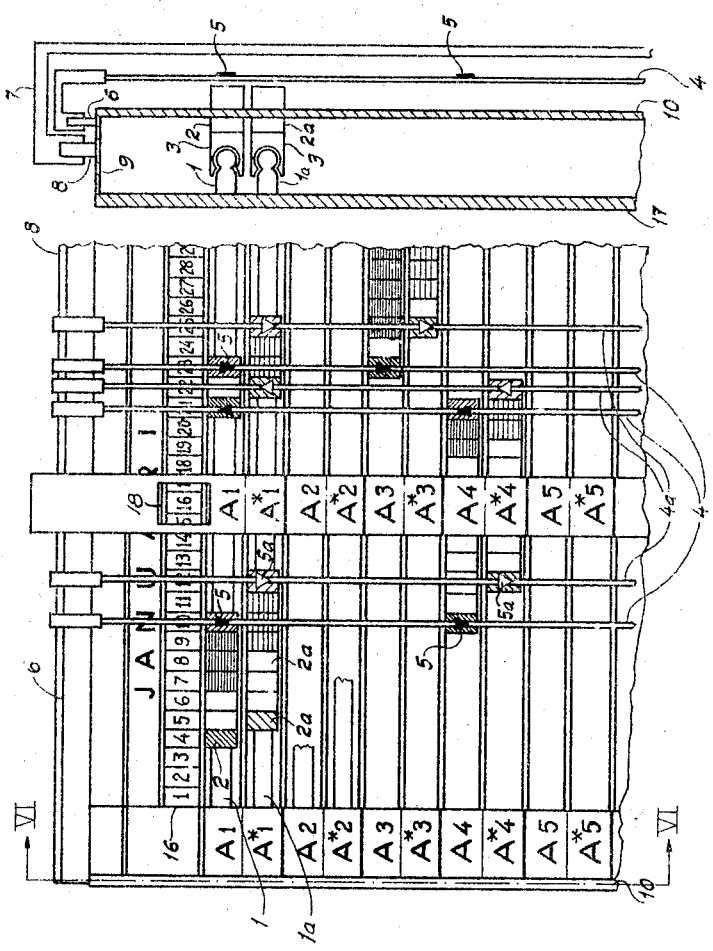
INVENTOR.
ARTHUR BERGE
BY
Kurt Kelman
Agent United States Patent Office 3,270,709
Patented Sept. 6, 1966

3,270,709
DEVICE FOR ORGANIZING AND PLANNING VARIOUS ACTIVITIES
Arthur Berge, Wennerbergsgatan,
Stockholm 6, Sweden
Filed Jan. 23, 1964, Ser. No. 339,713
Claims priority, application Sweden, Feb. 1, 1963,
1,106/63; May 29, 1963, 5,980/63
8 Claims. (Cl. 116—135)

The present invention refers to display devices for indicating the progress of related operations. Such devices may be used for planning or checking various operations in manufacturing processes, transportation, allocation and in the transmission of information.

The device is of the type comprising a preferably rectangular board or support structure which, in a manner known per se, comprises a system of coordinates extending along mutually perpendicular axes. A series of indicia or display means each representing one operation is distributed along one axis, and a time scale consisting of a series of time units or display means each representing a certain period of time (for example months, weeks, days, hours) is distributed along the other axis.

The present invention has for its object to solve the problem of vizualising the connections and mutual interdependence between various activities in an enterprise or parts of the same in order to make possible the rapid coordination of available labour, so that the facilities be fully utilized while causing the least possible delay.

Throughout the specification and claims, the term "operation" designates planned and/or completed processes of operating and/or transportation and/or communication. According to the invention, a plurality of displaceable runners of which some differ visually from others to indicate respective stages of the operation represented by the aligned indicium at the time indicated by the aligned time unit, are mounted for movement along the other axis. Indicator rods are displaceably mounted for movement along the other axis and extend perpendicularly thereto, and pointers on the rods indicate the interdependence of one operation represented by one of the indicia to another operation represented by another indicium.

The invention will be described more in detail hereinafter with reference to the accompanying drawings, in which—

FIG. 1 is a front view of one embodiment of the invention;

FIG. 2 is a view of the same device in section along line II—II in FIG. 1;

FIG. 3 is a graphic representation of a time scale indicating various stages of an operation;

FIG. 4 illustrates specific embodiment of a rail and runners useful in the device;

FIG. 5 is a front view of another embodiment of the invention, and

FIG. 6 is a view of the same embodiment in section along line VI—VI in FIG. 5.

The same numerals refer to like parts in the various figures.

As will be seen by FIG. 1 and 2, parallel rails 1 are in alignment with, and correspond in number to the indicia or display means A1–A5. The rails are mounted on the board, and runners 2 can be removably mounted on the rails with their supports 3 in such a manner that the runners may be laterally displaced along rails 1 in their longitudinal direction. A number of indicator rods 4 serving to carry a number of removable pointers, which can be mounted on the same and for example have the shape of arrows 5, may, be displaced laterally along a rail 6. Arrows 5 may, for example, be removably secured to rods 5 for displacement axially of said rods in a manner similar to that employed for mounting the runner supports 3 on rails 1 as best shown in FIG. 2. In case the board or support structure is of large dimensions, it may be useful to have an indicia slide 7 with a window 18 arranged to be provided with the same indicia as hereinabove mentioned; the slide being arranged in such a way that it may be displaced laterally on a rail 8. The rails 6 and 8 are mounted on a frame support comprising portions 9 and 10.

The runners 2, which may be made of plastic, wood, metal or the like, are of different colour, so that it will be possible for one line, for example A1, by means of the difference in colour to indicate at least four different stages of operation corresponding to the times $t_1$, $t_2$, $t_3$ and $t_4$ (FIG. 3).

Alternately, the runners 2 may be lamps 11 of different colour, the connecting wires 12, 13 or sockets of which are of such a structure that they can be attached to a rail of the same type as rail 1, the rail in this case, however, being provided with insulating material inbetween the current carrying members 14 and 15. The length of each runner 2 as measured along the scale 16 corresponds to a time unit in accordance with the time period indicated on scale 16, for example days of a month.

The function of the invention will now be explained more in detail by means of the following example. Assuming that operation A1 stands for a drawing job carried out by a designer, who is being informed on January 4th that the job is to be started (runner 2 hatched in diagonal lines in line A1 beneath 4 on time scale 16). It is further assumed that the job cannot be started until January 7th and be completed on January 12th (compare the runners beneath 7 to 12 in line A1), and it is the same day forwarded (downward arrow 5) for checking operation A4 to the chief designer, who gets the drawings on the 12th, but cannot begin with the checking until the 19th, the job being terminated on the 21st (runners beneath 19 to 21 in line A4); the same day he sends it back (upward arrow 5) to the respective designer for completion of the drawings.

This job is started without delay and the completed drawings are forwarded (downward arrow) to the lathe department operation A3 on January 23rd. The job A3 is started in the lathe department with one day's delay.

It is clear from the example that it will be possible by means of the invention to indicate the times illustrated by FIG. 3 and consisting of the time of arrival $t_1$, the start of a job or an activity $t_2$, the completion of the job or activity $t_3$, and the time of transportation $t_4$ as well as the duration of th job or activity $t_3-t_2$, and the duration of the delays $t_2-t_1$ and $t_4-t_3$. Furthermore, it is possible by the direction of the pointers 5 to indicate interdependences between the activities and/or allocations or communications as functions of the time.

An embodiment shown in FIGS. 5 and 6 of the invention has for its object to make it possible with one and the same device to indicate two courses of events with reference to the same object, one being the operation planned beforehand and the other one the operation as it actually proceeds, each separately, but also showing their mutual relations and their relation to the time scale employed in the device.

It is a well-known fact that in fairly large industrial plants or a large building enterprise some hundred projects may be under operation simultaneously, while the said projects on a certain date are in different phases of planning and completion. If the device in FIG. 5 is employed for each project, it will be possible to get an immediate picture of how the facilities are utilized and the possibilities of rearranging them, in case this should be desirable or necessary.

As will be seen by FIGS. 5 and 6 the embodiment here illustrated differs from that in FIGS. 1 and 2 in that each type of operation is represented by a pair of indicia or display means, for example A1, A*1, and thus comprises two rails 1, 1a, rail 1 corresponding to the planned operation and 1a corresponding to the actual operation. Two visually different types of runner 2, 2a are aligned with the respective indicia of the pair, 2 being assumed to show the planned operation and 2a the actual operation. An important difference is further that there are two types of pointers, such as arrows 5 and 5a, 5 referring to the planned operation and 5a to the actual operation. The pointers should also be different in appearance (for example of different colour).

In general, the pointers will be disposed on different indicator rods 4, 4a for the planned operation and the actual operation.

The direction and colour of the pointers indicate the interdependences between the stages of the various operations. In the following example it is assumed that A1, A*1 stand for drawing jobs (designer), A3, A*3 for lathe operations (lathe department), and A4, A*4 for the checking operation (chief designer).

The information that the drawing job is to be begun arrives on January 4th, the work itself should be started on January 7th, and be completed on January 10th.

As will be seen by the line for A*1, the information that the job was to be started was delayed by one day till the 5th, hence the delay $(t_2-t_1)$ was one day longer than planned. However, the job was completed with a delay of two days, i.e. on January 12th, as compared with the planned date, owing to unforeseen circumstances.

The chief designer is informed about the delay when he receives the drawings. He succeeds in reducing the planned delay $(t_2-t_1)$ by one day, completed his work within the period planned, i.e. three days, and when he forwards the drawings to the designer for supplementation on January 22nd, the project is delayed by one day only.

The designer carries out the supplementary work in the planned period but forgets to forward the drawings the same day the work is terminated, thus causing a delay (of the type of $t_4-t_3$).

The lathe department receives the drawings with two days' delay on the 26th, and on January 28th the project has been delayed by two days. The possibility of reducing the delay during the following progress of the project is now to be examined by means of the devices illustrated in FIG. 1 and/or FIG. 5, indicating other projects.

Since a plurality of projects under operation cannot reasonably all be delayed simultaneously, it will be possible by examining the devices for the various projects to find out which activities have been completed before the fixed data and then change over the facilities to those projects which are delayed or for which there may be a risk of delay. It is obvious that the devices according to the invention are not limited solely to the examples here described and illustrated but find a wide scope within trade and industry.

What is claimed is:

1. A device for indicating and displaying the coordination of different types of operations comprising, a support structure, a plurality of linearly arranged first display means supported on said structure defining a first axis, each of said display means representing one of said operations, a second plurality of linearly arranged display means supported on said structure defining a second axis representing a time scale perpendicular to said first axis, a plurality of runner means supported on said support structure in alignment with each of said first display means for movement parallel to said second axis, means carried by certain of said runner means for imparting distinguishing visual characteristics thereto, a plurality of indicator rod means supported on said support structure for movement parallel to said second axis and extending perpendicularly thereto, and pointer means supported on said rod means for movement axially of said rod means and pointing in a direction parallel to said first axis.

2. The device of claim 1 wherein said pointer means are removably mounted on the indicator rods.

3. The device of claim 1 further comprising a plurality of parallel rails mounted on the support structure in alignment with respective ones of said first display means and extending in the direction of said second axis, said rails carrying said runners.

4. The device of claim 3, wherein said runners are removably mounted on said rails.

5. The device of claim 3, wherein each of said runners has a width equal to the width of a respective one of said second display means.

6. The device of claim 3, wherein said parallel rails includes two electrical conductors electrically insulated from each other and from said support structure, said runners consist of lamps of different color and electrical connection means electrically connecting and mechanically mounting the lamps on the two electrical conductors.

7. The device of claim 1, wherein each of said first display means corresponds to a different type of operation.

8. The device of claim 1, wherein a pair of said first display means corresponds to each different type of operation, one of the first display means of each pair corresponding to a planned one of said type of operation and the other first display means of each pair corresponding to an actual one of said type of operation, said runners aligned with respective ones of said pairs of first display means visually differing from one another, and a pair of said indicator rods with their pointer means associated with each pair of said first display means.

References Cited by the Examiner

UNITED STATES PATENTS

| | | | |
|---|---|---|---|
| 2,248,161 | 7/1941 | Cross | 116—135 |
| 2,480,614 | 8/1949 | Spargo | 116—135 |
| 2,627,682 | 2/1953 | Markey | 35—24 |
| 2,629,184 | 2/1953 | Johnson | 116—135 |
| 2,647,328 | 8/1953 | Ostrander | 116—135 |
| 2,649,790 | 8/1953 | Johnson | 116—135 |
| 2,801,797 | 8/1957 | Morgan | 235—89 |
| 2,838,862 | 6/1958 | McConnell | 116—135 |
| 2,884,713 | 5/1959 | Campbell | 116—135 |
| 2,921,290 | 1/1960 | Sansonetti | 35—24 |
| 2,994,296 | 8/1961 | Waldin | 116—135 |
| 3,064,377 | 11/1962 | Fitch | 116—135 |
| 3,124,885 | 3/1964 | Mendell | 116—135 |

FOREIGN PATENTS

| | | |
|---|---|---|
| Ad. 43,704 | 5/1934 | France. |
| 1,028,391 | 2/1953 | France. |

LOUIS J. CAPOZI, *Primary Examiner.*